BEST AVAILABLE COPY

J. OUTLAND & R. P. THOMAS.

Car-Coupling

No. 6,539.

Reissued July 13, 1875.

WITNESSES.

P. C. Dieterich.

H. B. McArthur

INVENTORS.

Josiah Outland

Robt. P. Thomas per C. H. Watson & Co

ATTORNEYS.

J. BITTING, PHOTO-LITHOGRAPHER, WASHINGTON, D. C.

BEST AVAILABLE COPY

UNITED STATES PATENT OFFICE.

JOSIAH OUTLAND AND ROBERT P. THOMAS, OF BARNESVILLE, OHIO.

IMPROVEMENT IN CAR-COUPLINGS.

Specification forming part of Letters Patent No. 151,615, dated June 2, 1874; reissue No. 6,539, dated July 13, 1875; application filed April 28, 1875.

*To all whom it may concern:*

Be it known that we, JOSIAH OUTLAND and ROBERT P. THOMAS, of Barnesville, in the county of Belmont and State of Ohio, have invented certain new and useful Improvements in Car-Couplings; and we do hereby declare that the following is a full, clear, and exact description thereof, that will enable others skilled in the art to which it appertains to make and use the same, reference being had to the accompanying drawings, and to the letters of reference marked there on, which form a part of this specification.

The nature of our invention consists in the construction and arrangement of a car-coupling, as will be hereinafter more fully set forth.

Figure 1:
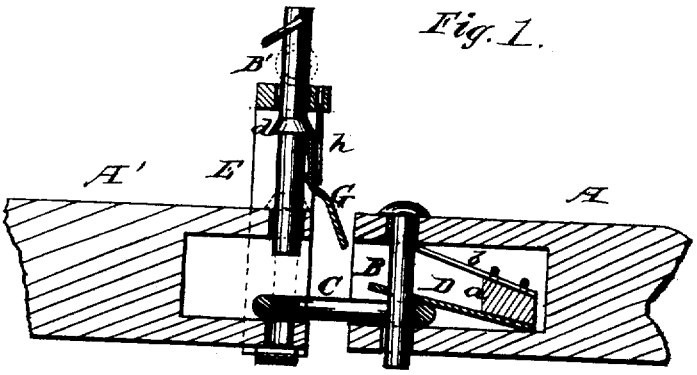
Figure 2:
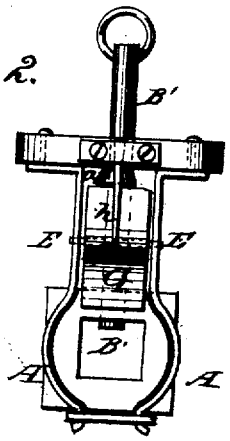

In the accompanying drawings, Figure 1 is a longitudinal vertical section of our car-coupling, and Fig. 2 is a front view of one of the draw-heads.

A and A′ represent the two adjoining or opposite draw-heads of two railroad-cars, each having an interior chamber or recess, as is usual. B represents the ordinary coupling-pin used in the draw-head A, and C is the ordinary coupling-link. Within the draw-head A is placed a loose plate, D, in the front end of which is a hole for the passage of the coupling-pin B. At the rear end of the plate D is a block or enlargement, *a*, and to this is attached a spring, *b*, which extends forward and bears against the roof of the draw-head, as shown in Fig. 1. The coupling-link C is to be inserted between the plate D and the bottom of the draw-head, and then the pin B passed through, by which means the link is held in a horizontal position to enter the opposite draw-head A′. The plate D, with its spring, being loose and entirely disconnected from the draw-head, it may be taken out and reversed, so that the coupling-link will be held between the plate and the roof of the draw-head, and thus cause the link to enter a high draw-head on the opposite car. In either case the coupling-link will have free play up and down. On the front end of the draw-head A′ is secured a frame, E, which extends upward from the draw-head for a suitable distance, and through the same is passed the coupling-pin B′, which pin also passes through the draw-head A′, in the usual manner. The coupling-pin B′ is elongated, and provided with a circumferential collar, *d*, which, when the pin is raised, is caught by and supported by a trigger, G, pivoted in the frame E. The upper end of the trigger is pressed against the pin B′, under the collar *d*, by a spring, *h*.

When the two draw-heads are brought together to couple the cars the link C enters the draw-head A′, and the draw-head A strikes the lower end of the trigger G, thereby turning the same on its pivot, so that the upper end thereof will be drawn from under the collar *d*, and thus release the pin, so that it will fall down of its own gravity and couple the cars.

The pins B′ may be raised for uncoupling the cars either by a chain or other suitable devices.

This self-coupling may be attached to both ends of the cars; but only one link and spring are needed to a car, as they, being removable, can be changed from one draw-head to the other.

Having thus fully described our invention, what we claim as new, and desire to secure by Letters Patent, is—

1. In combination with a draw-head, coupling-pin, and link, the reversible plate D, provided with the spring *b*, and placed loosely within the draw-head, substantially as and for the purposes set forth.

2. The draw-head A, pin B, and reversible plate D, with spring *b*, in combination with the link C and automatic coupling device, substantially as and for the purpose set forth.

In testimony that we claim the foregoing we have hereunto set our hands this 24th day of April, 1875.

his
JOSIAH × OUTLAND.
mark.

ROBERT P. THOMAS.

Witnesses:
THOMAS M. JOHNSON,
A. J. DOLISON.